United States Patent [19]
Attal

[11] Patent Number: 5,603,032
[45] Date of Patent: Feb. 11, 1997

[54] METHOD FOR ADMINISTRATION OF APPLICATIONS BY STANDARD PROTOCOLS

[75] Inventor: Denis Attal, Chatillon, France

[73] Assignee: Bull, S.A., Paris, France

[21] Appl. No.: 192,812

[22] Filed: Feb. 7, 1994

[30] Foreign Application Priority Data

Feb. 10, 1993 [FR] France ................................ 93 01446

[51] Int. Cl.$^6$ ........................................................ G06F 12/00
[52] U.S. Cl. ........................................................ 395/704
[58] Field of Search .................................. 395/650, 700

[56] References Cited

U.S. PATENT DOCUMENTS

| | | | |
|---|---|---|---|
| 4,589,068 | 5/1986 | Heinen | 395/183.08 |
| 5,075,847 | 12/1991 | Fromme | 395/700 |
| 5,263,165 | 11/1993 | Janis | 395/490 |
| 5,265,254 | 11/1993 | Blasciak et al. | 395/700 |
| 5,313,616 | 5/1994 | Cline et al. | 395/700 |
| 5,339,406 | 8/1994 | Carney et al. | 395/775 |
| 5,434,971 | 7/1995 | Lysakowski, Jr. | 395/700 |
| 5,446,575 | 8/1995 | Lysakowski, Jr. | 395/700 |
| 5,450,586 | 9/1995 | Kuzara et al. | 395/700 |

OTHER PUBLICATIONS

Maybee, "A Network Oriental Symbolic Debugger," Jan. 1990, p. 41 line 1–page 43 line 2, p. 47 lines 1–5.
Faulkner et al., "The Process File System and Process Model in Unix System V,"Jan. 1991, pp. 244, Col. 2 line 2–245, Col. 1, last line, pp. 248–249.
Griffin et al., "A Debugger for Parallel Processes", Dec. 1988, pp. 1183–1187.
Mansfield, "Network Management in a Large Scale OSI–based Campus Network," Apr. 1992, pp. 566–569, 576.

*Primary Examiner*—Kevin A. Kriess
*Assistant Examiner*—John Q. Chavis
*Attorney, Agent, or Firm*—Kerkam, Stowell, Kondracki & Clarke, P.C.; Edward J. Kondracki

[57] ABSTRACT

This method for administration of an information processing resource by an arbitrary administration system (MAN) allows the management of any arbitrary application (APP) whose symbols table (ST) is contained in the executable program. To achieve this, an agent (AGE) is created in conformity with the standard administrative protocol (SNMP), this agent being parametrizable by means of the configuration file (CF) that the agent contains. Once the agent has been created, the agent (AGE), by way of the symbols table (ST), on the one hand, which provides the correspondence between the name of a variable and its implantation in memory, and by way of a system function call (SC) of the analysis process type, on the other hand, directly accesses the memory zone where the implantation is provided by the symbols table ST, to enable the proper processing operation as a function of queries from the administration system (MAN).

8 Claims, 1 Drawing Sheet

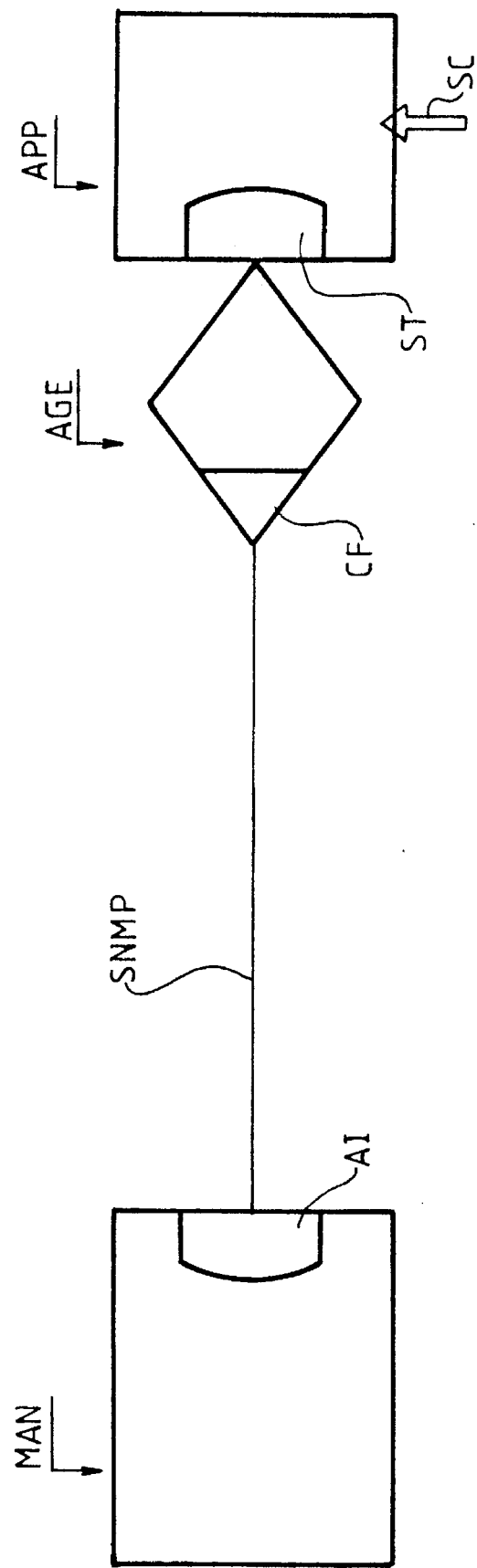

METHOD FOR ADMINISTRATION OF APPLICATIONS BY STANDARD PROTOCOLS

FIELD OF THE INVENTION

The present invention relates to a method for administration of an application by an object administration system in a network by an administrative protocol, where the executable program of the application contains the symbols table of the application.

BACKGROUND OF THE INVENTION

The purpose of an object administration system is to enable effective and easy management, in a network, of a set of highly diverse information processing resources, by manipulating them like objects. Current knowhow relates to the administration of a network or network resources that involve telecommunications equipment and computers. To aid in the management of a certain number of items of equipment, mechanisms or devices already in existence accordingly make it possible to obtain information by way of the communications systems: examples are bridges, dispatchers, or routers multiplexers, communications layers in computers, and so forth. To authorize such management, a dialog is set up by way of a predetermined standard administrative protocol and through the network, by means of queries, sent by the administration system to the various information processing resources, and responses to these queries, made to the administration system by the information processing resources involved. To make this dialog possible, an information processing device especially intended to facilitate the execution of this task is implanted in each information processing resource. This device is in fact the equivalent of the administration system in the equipment supporting the information processing resource to be administered, and it is this device that will execute the various orders on the account of the distant administration system. These devices are of various types depending on the administrative object model that they support and on the administrative protocol that they employ to communicate with the administration system. One example of such a device is the SNMP (Simple Network Management Protocol) agent, which is described in the paper entitled "Simple Network Management Protocol", Internet Working Group Request for Comments 1157, May 1990, and which uses the object model and administrative protocol defined by the IETF (Internet Engineering Task Force).

However, except for the devices described above, there are no mechanisms that make it possible to manage applications being run on different computers, and consequently these applications are not currently being administered. Hence this need, which arose virtually with the appearance of systems administration, is felt increasingly keenly, particularly with respect to applications that carry out dialog in the networks (data base, messaging, etc.), as well as applications specific to business (order management, exchanges between locations or branches, etc.). One question then arises: How can information relating to applications that are not necessarily effectively in the resource to be administered be collected? An initial response consists of providing for integration of an agent when an application is developed. In fact, in general, making a resource administratable means that the resource must be known, and accessing means must be created in order to make it controllable through an agent. Thus when an operating system is involved, access is conventionally documented, and when information is not available through a system call, it is generally possible to go and read this information in the memory itself of the system with a symbols table that provides the correspondence between a variable and its address in memory. Conversely, for applications, there is at present no external way whatever for an agent to collect the information, and it must be noted that the current trend is not to offer such access. In any case, another fundamental question arises: How can applications, for which modification is neither desired nor possible, be administered?

SUMMARY OF THE INVENTION

The object of the present invention is to fill this gap and to propose a method of administration of an application that authorizes effective, easy management of any arbitrary application whose executable program contains the symbols table, without it being necessary to modify the application in any way.

To do so, a method of administration of an application by an object administration system in a network by an administrative protocol, where the executable program of the application contains the symbols table of the application, mentioned in the initial paragraph, is notable in that first, an information processing device called an agent is created in conformity with the administrative protocol, this agent being parametrizable by means of a configuration file contained in the agent, and by way on the one hand of the symbols table of the application, providing the correspondence between the name of a variable and its implantation in memory, and on the other by a call of a system function used in the analysis processes making it possible to trace the execution and to monitor the processing operation of the application; the agent, once created, directly accesses the memory zone where the implantation is indicated by the symbols table, thus making it possible to run the proper processing operation relating to the application as a function of the queries of the administration system.

Hence the inventive step has consisted not only of posing the technical problem to be solved but also of furnishing an effective solution that is elegant and easy to use. In effect, it was crucial to consider that it was not possible to act only on the executable program of the application and hence on the memory itself of the application. Furthermore, once the problem had been clearly stated, it was fundamental to reason analogously by comparing two fields that a priori are completely unrelated, that is, the field of information systems administration and the field of debuggers, in order to create an agent used in a natural way to administer resources yet behaving like a debugger, a debugger in a known manner being a mechanism with which the execution of an application can be traced. To that end, as achieved in a debugging process, one of the system functions used in the analysis process is called in order to enable tracing the execution and monitoring the processing operation of the application, by going to read the information in the proper zones of the memory that are indicated in the symbols table. In this analogy, the SET or GET functions executed in an administration system correspond to reading a variable and modifying the contents of a variable, respectively. In the same way, an application containing its symbols table may be handled and hence administered directly without being modified by the agent created that makes it possible to drive this application.

In a remarkable way, the agent must be created in conformity with the administrative protocol actually used. To do this, in a first step, the application is modeled in the form of a set of administrative objects (object+attributes). In a second step, the agent is encoded as a particular interface of the application authorizing the dialog pertaining to the administrative objects (object+attributes) between the administration system and the application involved. Accordingly the agent is tasked on the one hand with making the correspondence between the application and its object representation, knowing that the administration system knows only this latter object, and on the other of transmitting the queries from the administration system to the application and transmitting the responses to these queries from the application to the administration system. In a third step, the description of the administrative objects is presented to the administration system in the language described for that purpose, this description of objects being stored in the configuration file contained in the agent created.

In a preferred example, the method of administration of an application by an administration system is used for an application running on a UNIX system (trademark registered by UNIX System Laboratories, Inc.). In this case, the agent may, depending on the terminology, correspond to a "father" process while the application itself corresponds to a "son" process that is started by the "father" process. Hence no perturbation whatever is introduced, and to achieve this it suffices to create a "father" process agent and interpolated in order to control the starting of the application. Then, thanks to a known system call of the UNIX "PTRACE" type and thanks to the symbols table of the application, the agent will be able to act upon the "son" process as soon as it receives a query from the administration system. Various actions may be taken, and recalling the aforementioned analogy, the following correspondences may be made: the GET function corresponding with reading of a variable; the SET function corresponding to the modification of the contents of a variable; an EVENT or ACTION function corresponding to an action on an application such as locking up, restarting, a breakpoint, etc.

The invention will be better understood from the ensuing description in conjunction with the accompanying drawing, all being provided by way of non-limiting example.

BRIEF DESCRIPTION OF THE DRAWING

The drawing shows an example of administration of an application APP by an administration system MAN, the executable program of the application containing the symbols table ST. In a general way, the administration systems and the agents used for the dialog with the systems MAN are based on a model of administrative objects that makes it possible to represent the real world (systems, communications software, etc.) by means of organized abstract objects in the administration data bases.

DETAILED DESCRIPTION OF THE PREFERRED EMBODIMENTS

For better appreciation of the context, the system MAN, which may be arbitrary, can be reduced schematically to the use of three or four functions: the GET function for reading information; the SET function for regulating a certain number of parameters; the EVENT function for the reception and conversion of events; and sometimes the ACTION function for starting commands and for tripping a certain number of actions. These various functions must accordingly circulate between the system MAN and the resource to be managed, or in the present case the application APP, and will pertain to the modeling of the application APP. However, as already noted above, an application is not administratable directly by the system MAN, which in turn is also made up of a number of applications, if the application has not been provided before hand for this administration, as has been the case until now, and if there is no desire to modify it, which is true for by far the majority of cases. In fact, for reasons of protection, an application cannot go to read or modify another application. The overriding concept of the invention has been to shift this problem, which is insoluble in the field of administration, to the a priori unrelated field of debuggers, because in fact a mechanism does exist that is capable of driving and tracing the execution of an application: that is, the debugger. The debugger can trace the state of execution of a processing operation, optionally proceeding step by step; position a certain number of control parameters; place the stop points; and read the variables and optionally modify their contents, which can advantageously be compared to the execution of the GET, SET, EVENT and ACTION functions. To physically embody this concept in the field of administration, the present invention has proposed creating an agent that makes it possible to utilize the technique of a debugger.

Hence and in a non-limiting manner, in the example chosen, the system MAN may be made up of a set of applications, utilizing operations on the OSI CMIS (Common Management Information Service) model, to manipulate the objects supported by a specially created agent AGE, for example an SNMP (Simple Network Management Protocol) agent designed for a predetermined object model. Conventionally and in the example chosen, the SNMP agent communicates with the system MAN by way of an integrator agent AI, which in this case is also of the SNMP type, which converts the object or the specific SNMP operations into an object model or the standard CMIS operations. In this way, the CMIS operations necessary for the execution of queries sent by applications of the system MAN are converted into SNMP operations and transmitted to the SNMP agent involved. Similarly, when a response is received, it is also converted into a response to a corresponding CMIS operation and resent to the application involved in the system MAN.

The agent AGE is created in conformity with the standard administrative protocol SNMP and substantially by the following three steps. In the first step, the application APP is modeled in the form of a set of administrative objects of the SNMP model; in the second step, its encoding is done, thus creating the interface for the dialog pertaining to the administrative objects between the applications of the system MAN and the application APP, while in the third step, the description of the administrative objects is presented to the system MAN by means of a configuration file CF contained in the agent. The configuration file CF should advantageously include the list of variables, the list of objects, and the correspondence between the variables and objects. The agent is parametrizable thanks to this configuration file CF; the description of the application should be as complete as possible and as precise as possible, in order to make the agent highly effective. The management capacity and hence the power of the system MAN are directly linked with the effectiveness of the agent AGE.

Once the agent has been created, by means of the symbols table ST of the application on the one hand, which provides the correspondence between the name of a variable and its implantation in memory, and by means of a system function call SC of the analysis process type on the other, the agent can drive and monitor the execution of the application. In a preferred embodiment of the administration process, the application runs on a UNIX system. While at all times preserving the spirit of the above analogy, and with the awareness that in the UNIX world, an essential condition so that a debugger using a mechanism of the PTRACE type can operate is that it must be the "father" of the process to be monitored, it will be still better appreciated why the method according to the invention is also suitable for managing an application that runs under UNIX. In effect the agent AGE then corresponds to a "father" process and the application APP to a "son" process started by the "father" process. The agent can then, using a system call "PTRACE", trace the execution and monitor the processing operation of the application. It is then possible for it to access the memory zone where the implantation is listed in the symbols table of the application and to run the proper processing operation (reading, modification, etc.) as a function of the queries from the system MAN, and in return this agent transmits the responses to the queries that have been obtained to the system MAN. Hence any application that can be debugged can at present also be administered, without having been intended for that purpose and moreover without having been in any way modified.

In conclusion, although the administration of an application may not have been provided for nor been possible previously, the method of administration of an application described in the present invention can advantageously be used for the administration of a component application of any arbitrary kind without having to modify it; the executable program of the application need merely contain the symbols table. Moreover, the fact that an analogy may be imagined between the two essentially different fields, that is, the field of network administration and the field of software development or debugging, has made it possible to clearly state this technical problem encountered and to arrive at an an original, effective solution that is easy to implement. In fact, the symbols table used and the system call function of the analysis process type are elements originally conceived of for debugging, and similarly, in the UNIX world when the PTRACE-type mechanism is used, the fact that an agent is created and interpolated to control the starting and monitor the execution of the application is an astute means used with the implementation of debuggers. The agent created for the implementation of the present method is generic, because it enables access to any type of application, while the configuration file that it contains makes it parametrizable. Finally, it must be stated that this agent is all the more effective and effectively used by the administration system, the more precise and complete the description of the application in its configuration file.

I claim:

1. A method of administration of an application by an object administration system in a network by an administrative protocol, where an executable program of the application contains a symbols table for the application, said method comprising the steps of administering said application by creating an information processing device called an agent in conformity with the administrative protocol, said agent being parametrizable by a configuration file of said agent, and by said symbols table of the application, enabling correspondence between a name of a variable and a location of said variable in memory and a call of a system function used in analysis processes, tracing and monitoring the execution of a processing operation of said application, causing said agent to directly access using said symbols table, a memory zone in said memory corresponding to said location of said variable, and running a proper processing operation relating to the application as a function of queries of the administration system.

2. A method of administration of an application by an administration system in accordance with claim 1, wherein creating said agent includes modeling the administration in the form of a set of administrative objects, encoding said agent by an interface that authorizes communications pertaining to the administrative objects between the administration system and the application, and presenting a description of the administrative objects to the administration system using said configuration file contained in the agent.

3. A method of administration of an application by an administration system in accordance with claim 1, wherein said step of creating said agent includes defining said configuration file to include a list of variables, a list of objects, and a correspondence between the variable and the objects.

4. The method of administration of an application by an administration system in accordance with claim 1, wherein said application is running on a UNIX system, said method further including enabling said agent to control starting of the application to be administered, said agent then corresponding to a "father" process, while the application itself corresponds to a "son" process started by the "father" process, and using the symbols table and a system call of the UNIX PTRACE type to enable said agent to execute the processing operation desired for the application.

5. A method of administration of an application by an administration system in accordance with claim 2, wherein said step of creating said agent includes defining said configuration file to include a list of variables, a list of objects, and a correspondence between the variables and the objects.

6. The method of administration of an application by an administration system in accordance with claim 2, wherein said application is running on a UNIX system, said method further including enabling said agent to control starting of the application to be administered, said agent then corresponding to a "father" process, while the application itself corresponds to a "son" process started by the "father" process, and using the symbols table and a system call of the UNIX PTRACE type to enable said agent to execute the processing operation desired for the application.

7. The method of administration of an application by an administration system in accordance with claim 3, wherein said application is running on a UNIX system, said method further including enabling said agent to control starting of the application to be administered, said agent then corresponding to a "father" process, while the application itself corresponds to a "son" process started by the "father" process, and using the symbols table and a system call of the UNIX PTRACE type to enable said agent to execute the processing operation desired for the application.

8. The method of administration of an application by an administration system in accordance with claim 5, wherein said application is running on a UNIX system, said method further including enabling said agent to control starting of the application to be administered, said agent then corresponding to a "father" process, while the application itself corresponds to a "son" process started by the "father" process, and using the symbols table and a system call of the UNIX PTRACE type to enable said agent to execute the processing operation desired for the application.

* * * * *